(12) United States Patent
Soufflet et al.

(10) Patent No.: US 7,983,911 B2
(45) Date of Patent: Jul. 19, 2011

(54) METHOD, MODULE, DEVICE AND SERVER FOR VOICE RECOGNITION

(75) Inventors: Frédéric Soufflet, Chateaugiron (FR); Nour-Eddine Tazine, Noyal sur Vilaine (FR)

(73) Assignee: Thomson Licensing, Boulogne-Billancourt (FR)

( * ) Notice: Subject to any disclaimer, the term of this patent is extended or adjusted under 35 U.S.C. 154(b) by 886 days.

(21) Appl. No.: 10/467,586

(22) PCT Filed: Feb. 12, 2002

(86) PCT No.: PCT/FR02/00518
§ 371 (c)(1),
(2), (4) Date: Jan. 9, 2004

(87) PCT Pub. No.: WO02/065454
PCT Pub. Date: Aug. 22, 2002

(65) Prior Publication Data
US 2005/0102142 A1   May 12, 2005

(30) Foreign Application Priority Data
Feb. 13, 2001 (FR) ..................... 01 01910

(51) Int. Cl.
*G10L 15/04* (2006.01)
*G10L 15/00* (2006.01)
(52) U.S. Cl. ......... 704/251; 704/231; 704/235; 704/236
(58) Field of Classification Search .................. 704/235, 704/260, 257, 270.1, 231, 236, 251
See application file for complete search history.

(56) References Cited

U.S. PATENT DOCUMENTS

| | | | | |
|---|---|---|---|---|
| 5,384,892 A | * | 1/1995 | Strong | 704/243 |
| 5,852,801 A | * | 12/1998 | Hon et al. | 704/244 |
| 5,937,385 A | * | 8/1999 | Zadrozny et al. | 704/257 |

(Continued)

FOREIGN PATENT DOCUMENTS
EP   0945851   9/1999
(Continued)

OTHER PUBLICATIONS

Jelinek, et al. "A Dynamic Language Model for Speech Recognition", Proc. ARPA Workshop on Speech and Natural Language, 1991, pp. 293-295.*

(Continued)

*Primary Examiner* — James S Wozniak
*Assistant Examiner* — Jialong He
(74) *Attorney, Agent, or Firm* — Roberts D. Shedd; Joseph J. Opalach; Catherine A. Cooper

(57) ABSTRACT

The invention relates to a speech recognition process implemented in at least one terminal (114), the speech recognition process using a language model (311), comprising the following steps:
- detection (502) of at least one unrecognized expression in one of the terminals;
- recording (503) in the terminal of data representative of the unrecognized expression (309);
- transmission (603) by the terminal of the recorded data to a remote server (116);
- analysis, (803) at the level of the remote server, of the data and generation (805) of information for correcting the said language model taking account of at least one part of the unrecognized expression; and
- transmission (806) from the server to at least one terminal (114, 117, 118) of the correcting information, so as to allow future recognition of at least certain of the unrecognized expressions.

The invention also relates to corresponding modules, devices (102) and a remote server (116).

5 Claims, 6 Drawing Sheets

U.S. PATENT DOCUMENTS

| | | | |
|---|---|---|---|
| 5,953,700 A * | 9/1999 | Kanevsky et al. | 704/270.1 |
| 5,956,683 A * | 9/1999 | Jacobs et al. | 704/270.1 |
| 6,058,363 A * | 5/2000 | Ramalingam | 704/251 |
| 6,078,886 A * | 6/2000 | Dragosh et al. | 704/270 |
| 6,157,910 A * | 12/2000 | Ortega | 704/231 |
| 6,173,259 B1 * | 1/2001 | Bijl et al. | 704/235 |
| 6,195,636 B1 * | 2/2001 | Crupi et al. | 704/231 |
| 6,195,641 B1 | 2/2001 | Loring et al. | |
| 6,275,803 B1 * | 8/2001 | Lewis | 704/257 |
| 6,360,201 B1 * | 3/2002 | Lewis et al. | 704/251 |
| 6,408,272 B1 * | 6/2002 | White et al. | 704/270.1 |
| 6,430,551 B1 * | 8/2002 | Thelen et al. | 1/1 |
| 6,484,136 B1 * | 11/2002 | Kanevsky et al. | 704/9 |
| 6,487,534 B1 * | 11/2002 | Thelen et al. | 704/270 |
| 7,228,270 B2 * | 6/2007 | Aso | 704/10 |
| 2001/0056346 A1 * | 12/2001 | Ueyama et al. | 704/246 |
| 2003/0182113 A1 * | 9/2003 | Huang | 704/231 |
| 2003/0182131 A1 * | 9/2003 | Arnold et al. | 704/275 |

FOREIGN PATENT DOCUMENTS

| | | |
|---|---|---|
| EP | 1047046 | 10/2000 |
| JP | 7-222248 | 8/1995 |
| JP | 11-327583 | 11/1999 |
| WO | 00/23985 | 4/2000 |
| WO | WO 00/58942 | 10/2000 |

OTHER PUBLICATIONS

Search report dated May 24, 2002.

* cited by examiner

METHOD, MODULE, DEVICE AND SERVER FOR VOICE RECOGNITION

CROSS REFERENCE TO RELATED APPLICATIONS

This application claims the benefit, under 35 U.S.C. §365 of International Application PCT/FR02/00518, filed Feb. 12, 2002, which was published in accordance with PCT Article 21(2) on Aug. 22, 2002 in French and which claims the benefit of French patent application No. 01/01910, filed Feb. 13, 2001.

PCT/FR00/03329, dated 29 Nov. 1999, filed in the name of Thomson Multimedia

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The present invention concerns the field of speech interfaces.

More precisely, the invention relates to the optimization of language models and/or of phonetic units in terminals using speech recognition.

(2) Description of Related Art

Information or control systems are making ever increasing use of a speech interface to make interaction with the user faster and/or more intuitive. Since these systems are becoming ever more complex, the requirements in terms of speech recognition are ever more considerable, both as regards the extent of recognition (very large vocabulary) and the speed of recognition (real time).

Speech recognition processes based on the use of language models (probability that a given word of the vocabulary of the application follows another word or group of words in the chronological order of the sentence) and of phonetic units are known in the state of the art. These techniques are in particular described in the work by Frederik Jelinek "Statistical Methods for Speech Recognition" published by MIT Press in 1997.

These techniques rely on language models and phonetic units which are produced from representative speech samples (emanating for example from a population of users of a terminal who are made to utter commands).

In practice, the language models must take account of the speaking style ordinarily employed by a user of the system, and in particular of his "defects": hesitations, false starts, change of mind, etc.

The quality of a language model used greatly influences the reliability of the speech recognition. This quality is most often measured by an index referred to as the perplexity of the language model, and which schematically represents the number of choices which the system must make for each decoded word. The lower this perplexity, the better the quality.

The language model is necessary to translate the speech signal into a textual string of words, a step often used by dialogue systems. It is then necessary to construct a comprehension logic which makes it possible to comprehend the query so as to reply to it.

There are two standard methods for producing large vocabulary language models:

The so-called N-gram statistical method, most often employing a bigram or trigram, consists in assuming that the probability of occurrence of a word in the sentence depends solely on the N words which precede it, independently of the rest of its context in the sentence.

If one takes the example of the trigram for a vocabulary of 1000 words, it would be necessary to define $1000^3$ probabilities to define the language model, this being impossible. The words are therefore grouped into sets which are either defined explicitly by the model designer, or deduced by self-organizing methods.

This language model is therefore constructed from a text corpus automatically.

This type of language model is used mainly for speech dictation systems whose ultimate functionality is to translate the speech signal into a text, without any comprehension phase being necessary.

The second method consists in describing the syntax by means of a probabilistic grammar, typically a context-free grammar defined by virtue of a set of rules described in the so-called Backus Naur Form or BNF, or an extension of this form to contextual grammars. The rules describing grammars are most often handwritten. This type of language model is suitable for command and control applications, in which the recognition phase is followed by a phase of controlling an appliance or of searching for information in a database.

The language model of an application describes the set of expressions (for example sentences) that the application will be required to recognize. A drawback of the prior art is that, if the language model is of poor quality, the recognition system, even if it performs extremely well at the acoustico-phonetic decoding level, will have mediocre performance for certain expressions.

The stochastic type language models do not have, properly speaking, a clear definition of the expressions which are in the language model, and of those which are outside. Certain expressions simply have a higher a priori probability of occurrence than others.

The language models of probabilistic grammar type show a clear difference between expressions belonging to the language models, and expressions external to the language model. In these models, expressions therefore exist which will never be able to be recognized, regardless of the quality of the phonetic models used. These are generally expressions having no meaning or that carry a meaning outside of the field of application of the system developed.

It turns out that the language models of probabilistic type and their derivatives are more effective for command and control applications. These grammars are often written by hand, and one of the main difficulties of the development of dialogue systems is to offer a language model of good quality.

In particular, as far as the models of grammar type are concerned, it is not possible to exhaustively define a language in particular if the latter is likely to be used by a large population (case for example of a remote control for mass-market appliances). It is not possible to take account of all the possible expressions and turns of phrase (from formal language to slang), and/or of errors of grammar, etc.

BRIEF SUMMARY OF THE INVENTION

The invention relates to a speech recognition process and system making it possible to modify and improve a language model remotely, on the basis of the recordings of expressions unrecognized by the system.

More precisely, the subject of the invention is a speech recognition process implemented in at least one terminal, the said speech recognition process using a language model, characterized in that it comprises the following steps:
  detection of at least one unrecognized expression in one of the terminals;
  recording in the terminal of data representative of the unrecognized expression;
  transmission by the terminal of the recorded data to a remote server, via a first transmission channel;
  analysis, at the level of the remote server, of the data and generation of information for correcting the language model taking account of at least one part of the unrecognized expressions; and
  transmission via a second transmission channel from the server to at least one terminal of the correcting information, so as to allow future recognition of at least certain of the unrecognized expressions.

Thus, the invention relies on an entirely novel and inventive approach to speech recognition, which makes it possible to update the various elements allowing speech recognition as a function of locally unrecognized expressions, a remote server being furnished with considerable resources (for example human and/or computational capabilities) generating correcting information.

It is noted that here the language models comprise:
  language models in the strict sense (this being the case, for example, when the data, the subject of the recognition, are of purely textual type);
  models formed of one or more language models in the strict sense and of one or more sets of phonetic units (this corresponding in particular to the general case of speech recognition applied to speech samples).

The invention goes well beyond the straightforward updating of a vocabulary. Specifically, it is possible that, although all the words of an expression feature in the vocabulary used by the language model of the terminal, this expression may not be recognized. Only the updating of the language model itself then makes it possible to have this expression recognized subsequently. The updating of the vocabulary, which is one of the items of information from which the language model is derived, is not sufficient.

Here, the expressions are to be taken within the wide sense and relate to any vocal expression allowing interaction between a terminal and its user. Expressions (or utterances) comprise in particular sentences, phrases, isolated or non-isolated words, code words specific to the terminal, instructions, commands, etc.

The correcting information may comprise in particular information allowing partial or complete modification of the language model and/or phonetic units present in each terminal by deleting, replacing or adding elements therein.

The server can receive data from each terminal allowing it to improve the language model and/or the phonetic units present in the data sending terminal and also in all other terminals, each of the terminals benefiting from the shared experience acquired by the server from all the terminals.

Thus, the invention makes it possible to take into account language styles or turns of phrase specific to certain users (for example, the expression "8 pm in the evening" (pleonasm which is hard to imagine a priori) instead of "8 pm" or "8 o'clock in the evening") and for which provision had not been made in the course of the construction of the language model implemented.

Furthermore, the invention takes into account the evolution of living languages (new turns of phrase or expressions, etc).

It is noted that the invention applies equally well to language models of stochastic type and to language models of probabilistic grammar type. When the invention is applied to language models of stochastic type, there are generally very many correcting data for influencing recognition, whereas the correcting data for a model of probabilistic grammar type may be scanty and have an appreciable influence on the effectiveness and reliability of recognition.

According to a particular characteristic, the process is noteworthy in that the data representative of the unrecognized expressions comprise a compressed speech recording representative of parameters descriptive of the acoustic signal.

Thus, the invention advantageously makes it possible to take into account the voice data sent to the source for fine analysis at the server level, while limiting the volume of data transmitted to the remote server.

According to a particular characteristic, the process is noteworthy in that during the step of transmission by the terminal, the latter furthermore transmits to the server at least one of the items of information forming part of the group comprising:
  information of context of use of the speech recognition process when an expression has not been recognized; and
  information relating to the speaker who has uttered an unrecognized expression.

Thus, speech recognition of the expressions unrecognized by the terminal, which may be performed remotely, is facilitated.

Furthermore, a check of the validity of the content of the unrecognized expressions may be performed as a function of the context. (For example, a command "record the transmission" has a meaning and is therefore valid when the terminal to which it is addressed is a video recorder and has no meaning in respect of a mobile telephone).

According to a particular characteristic, the process is noteworthy in that it implements an encryption and/or a scrambling of the recorded data and/or of the correcting information.

Thus, the data are made secure effectively and remain confidential.

The information also relates to a speech recognition module using a language model, characterized in that it comprises:
  an analyser detecting unrecognized expressions;
  a recorder of data representative of at least one unrecognized expression;
  a transmitter transmitting the recorded data to a remote server; and
  a receiver of correcting information allowing the correcting of the language model transmitted to the module allowing future recognition of at least certain of the unrecognized expressions by the module, the correcting information having been transmitted by the remote server after analysis at the level of the remote server of the data, and after generation of information for correcting the language model taking account of at least one part of the unrecognized expressions.

The invention also relates to a speech recognition device using a language model, characterized in that it comprises:
- an analyser detecting unrecognized expressions;
- a recorder of data representative of at least one unrecognized expression;
- a transmitter transmitting the recorded data to a remote server; and
- a receiver of correcting information allowing the correcting of the language model transmitted to the device allowing future recognition of at least certain of the unrecognized expressions by the device, the correcting information having been transmitted by the remote server after analysis at the level of the remote server of the data, and after generation of information for correcting the language model taking account of at least one part of the unrecognized expressions.

The invention also relates to a speech recognition server, the recognition being implemented in a set of at least one remote terminal, using a language model, characterized in that it comprises the following means:
- a receiver of data representative of at least one expression unrecognized by at least one terminal forming part of the set of at least one remote terminal and having detected the unrecognized expression during a speech recognition operation; and
- a sender sending to the set of at least one remote terminal correcting information obtained on the basis of an analysis of the data received at the level of the server, the correcting information allowing the correcting, by each of the terminals of the set, of the language model allowing future recognition of at least one part of the unrecognized expressions.

The particular characteristics and the advantages of the module, of the device and of the server for speech recognition being similar to those of the speech recognition process, they are not recalled here.

BRIEF DESCRIPTION OF THE SEVERAL VIEWS OF THE DRAWING

Other characteristics and advantages of the invention will become more clearly apparent when reading the following description of a preferred embodiment given by way of straightforward non-limiting illustrative example, and of the appended drawings, among which.

DETAILED DESCRIPTION OF THE INVENTION

Figure 1:
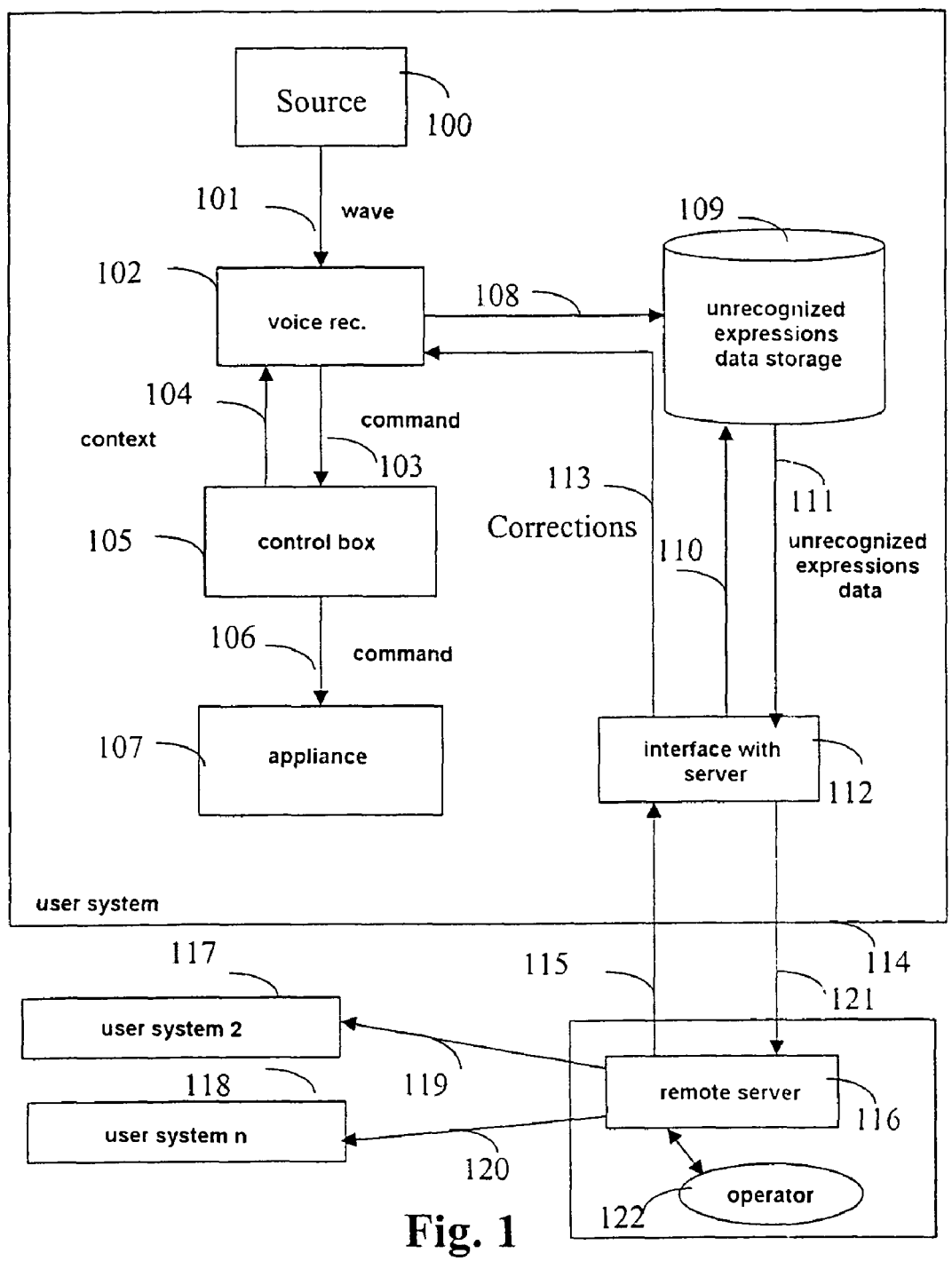
FIG. 1 depicts a general schematic of a system comprising a speech-controlled box, in which the technique of the invention may be implemented.

The general principle of the invention therefore relies on speech recognition implemented in terminals, the speech recognition process using a language model and/or a set of phonetic units that may be updated by a remote server when, in particular, the latter deems it necessary.

In a general manner, each terminal can recognize expressions (for example sentence or command) formulated by a speaker and execute a corresponding action.

Nevertheless, it is often found that certain expressions that are entirely comprehensible to a human being are not recognized by the device or the module implementing the voice recognition.

The failure of recognition may have multiple reasons:
- vocabulary used by the speaker not forming part of the language model;
- particular pronunciation (with accent for example);
- particular turn of phrase not provided for by the speech recognition device or module;
- etc.

Specifically, the language models and the sets of phonetic units are often constructed on the basis of statistical data which take into account samples of expressions customarily used by a typical population, certain words of vocabulary, pronunciations, and/or turns of phrase then not being (and unable to be) taken into account.

The invention relies firstly on detecting expressions unrecognized by the speech recognition device or module.

When an expression has not been recognized, the terminal records data representative of the signal corresponding to the unrecognized expressions (such as, for example, a speech digital recording of the expression), with a view to sending them to a remote server.

At the level of the remote server centralizing the unrecognized expressions from a set of terminals, a human operator can then analyse the unrecognized expressions.

Certain of them may prove to be incomprehensible and/or unutilizable and will be discarded.

On the other hand, others will be entirely comprehensible to the operator who will be able (if he deems it useful) through a man/machine link up to "translate" these expressions hitherto unrecognized by the terminals into a code comprehensible to the server.

The server can then take these expressions into account together with their translation so as to generate information for correcting the language model and/or the set of phonetic units.

It will be noted that correction is understood here as:
- modification of the model; and/or
- supplementing the model.

The server then sends the correcting information to each of the terminals which can update its language model and/or set of phonetic units which are enriched with numerous expressions unrecognized by itself or by other terminals.

Thus, the speech recognition of each of the terminals is improved by benefiting from the experience shared by all the terminals.

According to a particular mode of the invention, the analysis is not performed by an operator but by the server itself which may have much more considerable resources at its disposal than a straightforward terminal.

According to particular embodiments, the terminals send the server context data (for example the time, the date, a control performed manually or vocally after the failure of a speech command, the location, the type of terminal, etc.) together with the data representative of the signal corresponding to the unrecognized expressions.

This may facilitate the analysis work of the operator and/or of the server.

A general schematic of a system comprising a speech-controlled box, in which the technique of the invention may be implemented, is depicted in conjunction with FIG. 1.

This system comprises in particular:
- a remote server 116 controlled by a human operator 122; and
- a plurality of user systems 114, 117 and 118.

The remote server 116 is linked to each of the user systems 114, 117 and 118 via communication downlinks 115, 119 and 120 respectively. These links may be permanent or temporary and be of any type well known to the person skilled in the art. They may in particular be of broadcasting type and be based on RF, satellite or wire channels used by television or any other type such as, for example, an Internet type link.

FIG. 1 describes in particular the user system 114 which is linked via a communication uplink 121 to the server 116. This link can likewise be of any type well known to the person skilled in the art (in particular telephone, Internet, etc).

The user system 114 comprises in particular:
- a speech source 100 which may in particular consist of a microphone intended to pick up a speech signal produced by a speaker;
- a speech recognition box 102;
- a control box 105 intended to drive an appliance 107;
- a controlled appliance 107, for example of television, video recorder or mobile communication terminal type;
- a unit 109 for storing the expressions detected as unrecognized;
- an interface 112 allowing upward and downward communications to the server 116.

The source 100 is linked to the speech recognition box 102, via a link 101 which allows it to transmit an analogue source wave representative of a speech signal to the box 102.

The box 102 can retrieve context information 104 (such as for example the type of appliance 107 which can be controlled by the control box 105 or the list of control codes) via a link 104 and send commands to the control box 105 via a link 103.

The control box 105 sends commands via a link 106, for example infrared, to the appliance 107, as a function of the information which it recognizes according to its language model and its dictionary.

The control box 105 detects the expressions which it does not recognize, and, instead of simply rejecting them, by sending a non-recognition signal, it performs a recording of these expressions to the storage unit 109 via a link 108.

The unit 109 for storing the unrecognized expressions sends representative data to the interface 112 via a link 111, which relay them to the server 116 via the link 121. After correct transmission, the interface 110 can send a signal 110 to the storage unit 109 which can then erase the transmitted data.

The control box 105 receives, moreover, correcting data from the interface 112 via a link 113, that the interface 112 has itself received from the remote server via the link 115. These correcting data are taken into account by the control box 105 for the updating of language models and/or of sets of phonetic units.

According to the embodiment considered the source 100, the speech recognition box 102, the control box 105, the storage unit 109 and the interface 112 form part of one and the same device and thus the links 101, 103, 104, 108, 111, 110 and 113 are links internal to the device. The link 106 is typically a wireless link.

According to a first variant embodiment of the invention described in FIG. 1, the elements 100, 102, 105, 109 and 112 are partly or completely separate and do not form part of one and the same device. In this case, the links 101, 103, 104, 108, 111, 110 and 113 are external wire or other links.

According to a second variant, the source 100, the boxes 102 and 105, the storage unit 109 and the interface 112 as well as the appliance 107 form part of one and the same device and are interlinked by internal buses (links 101, 103, 104, 108, 111, 110, 113 and 106). This variant is particularly beneficial when the device is, for example, a mobile telephone or a portable communication terminal.

Figure 2:
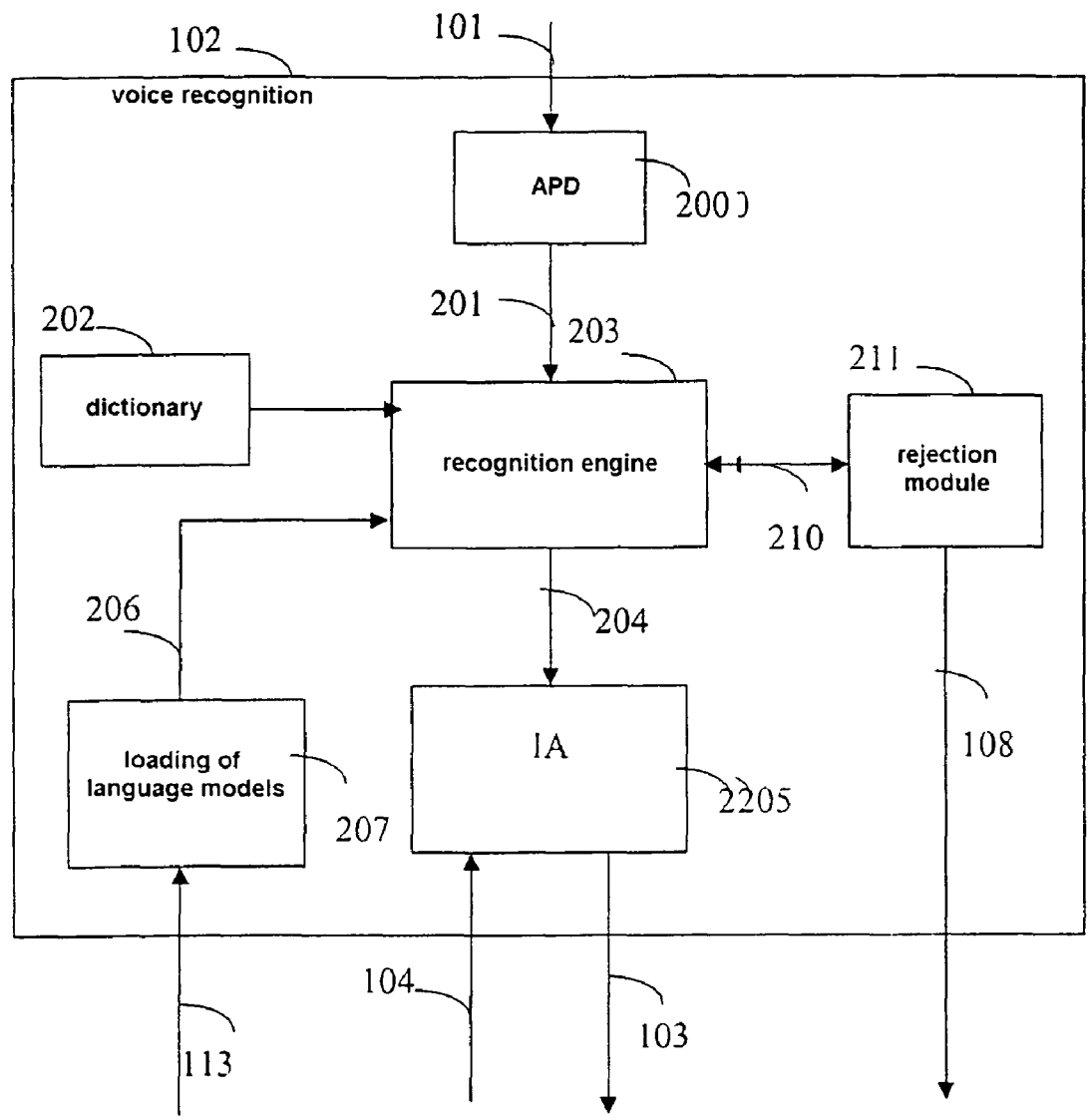
FIG. 2 depicts a schematic of the speech recognition box of the system of FIG. 1.

FIG. 2 depicts a schematic of a speech-controlled box such as the box 102 illustrated with regard to FIG. 2.

It is noted that the box 102 receives from outside the analogue source wave 101 which is processed by an Acoustico-Phonetic Decoder 200 or APD (also called the "front end"). The APD 200 samples the source wave 101 at regular intervals (typically every 10 ms) so as to produce real vectors or vectors belonging to code books, typically representing oral resonances that are sent via a link 201 to a recognition engine 203. The APD is for example based on a PLP (standing for "Perceptual Linear Prediction") described in particular in the article "Perceptual Linear Prediction (PLP) Analysis of Speech" written by Hynek Hermansky and published in "Journal of the Acoustical Society of America", Vol. 97, No 4, 1990 on pages 1738-1752.

With the aid of a dictionary 202, the recognition engine 203 analyses the real vectors that it receives, using in particular hidden Markov models or HMMs and language models (which represent the probability of one word following another word). Recognition engines are in particular described in detail in the book "Statistical Methods for Speech Recognition" written by Frederick Jelinek, and published by MIT Press in 1997.

The language model allows the recognition engine 203 (which may use in particular hidden Markov networks) to determine which words may follow a given word of any expression usable by the speaker in a given application, and to give the associated probability. The words in question belong to the vocabulary of the application, which may be, independently of the language model, of small size (typically from 10 to 300 words), or of large size (for example of size greater than 300 000 words).

Patent application PCT/FR00/03329, dated 29 Nov. 1999, filed in the name of Thomson Multimedia, describes a language model comprising a plurality of syntactic blocks. The use of the invention which is the subject of the present patent application is particularly advantageous in conjunction with this type of modular language model, since the modules may be updated separately, thereby avoiding the downloading of overly large volume files.

The language models are transmitted by a language model loading module 207. The module 207 itself receives language models, updates or corrections of language models and/or of phonetic units transmitted from the server via the link 113.

It is noted that the dictionary 202 belongs to the language model making reference to words from the dictionary. Thus, the dictionary 202 itself can be updated and/or corrected via a language model loaded by the module 207.

After implementation of a recognition operation based on the use of a Viterbi algorithm, the recognition engine 203 supplies the rejection module 211 with an ordered list of sequences of words in accordance with the language model, which exhibits the best score for the expression uttered.

The rejection module 211 works downstream of the recognition engine 203 and operates according to one or more of the following principles:

Sometimes, for reasons specific to the Viterbi algorithm, the latter may not produce a consistent list because the scores are so low that the limit of acceptable accuracies of the machine in terms of arithmetic computation is overstepped. There is therefore no consistent complete proposal. Thus, when the rejection module 211 detects one or more scores below a predetermined acceptable limit, the expression is rejected.

Each element of the list calculated by the Viterbi algorithm has been retained because the associated score was among the highest relative scores of all the possible expressions, according to the language model. Additionally, the Markov network associated with each of these expressions makes it possible to evaluate the intrinsic probability of the network in question producing the expression associated with the score observed. The rejection module 211 analyses this probability and if it is less than a predetermined threshold of acceptability of probability, the expression is rejected.

According to another method, for the best proposals obtained via the Viterbi algorithm, the rejection module 211 performs a complementary processing of the expressions, using criteria which had not been taken into account in the course of the Viterbi development. For example, it checks that those parts of the signal that have to be voiced because they are associated with vowels, are actually so. If the expressions proposed do not fulfil these conditions, they are rejected.

When the rejection module 211 rejects an expression, as illustrated previously, the expression is said to be unrecognized and a signal indicating the rejected expression is sent to the recognition engine 203. In parallel, the rejection module transmits a recording of the unrecognized expression to the storage unit 109 via the link 108.

The recognition engine 203 is responsible for recognizing expressions emanating from the APD 200 in the form of phonetic samples. Thus, the recognition engine 203 uses:

the phonetic units to construct the phonetic representation of a word in the form of a Markov model, each word of the dictionary 202 possibly possessing several "phonetizations"; and simultaneously the language model in the strict sense for recognizing expressions of greater or lesser complexity.

The recognition engine 203 supplies expressions which have been recognized (that is to say not rejected by the module 211) and which it has identified on the basis of the vectors received to a means 205 for translating these expressions into commands that can be understood by the appliance 107. This means 205 uses an artificial intelligence translation process which itself takes into account a context 104 supplied by the control box 105 before sending one or more commands 103 to the control box 105.

Figure 3:
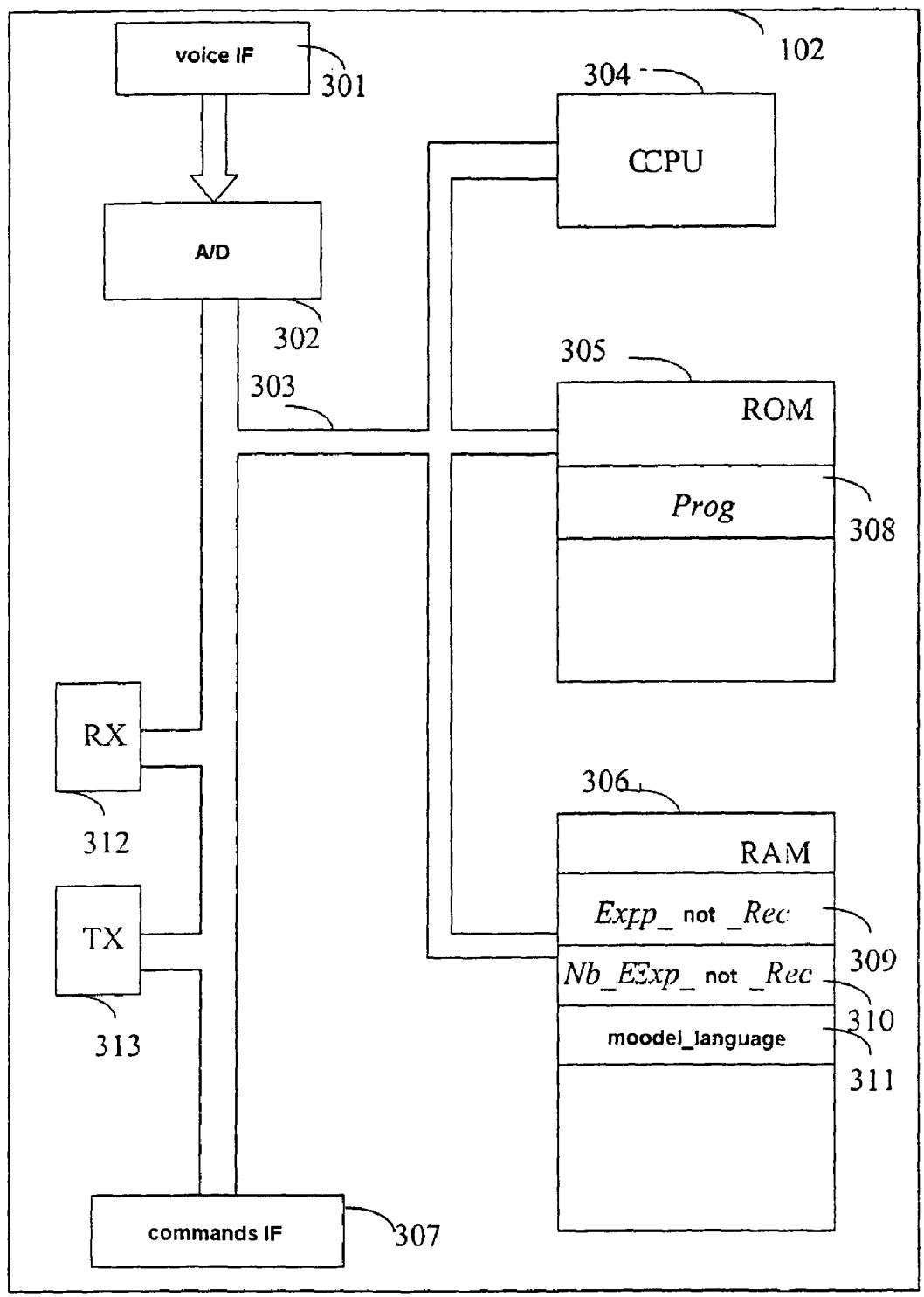
FIG. 3 describes an electronic diagram of a speech recognition box implementing the schematic of FIG. 2.

FIG. 3 diagrammatically illustrates a speech recognition module or device 102 such as illustrated in conjunction with FIG. 1, and implementing the schematic of FIG. 2.

The box 102 comprises interlinked by an address and data bus:
 a speech interface 301;
 an analogue-digital converter 302;
 a processor 304;
 a nonvolatile memory 305;
 a random access memory 306;
 a reception module 312;
 a transmission module 313; and
 an inputs/outputs interface 307.

Each of the elements illustrated in FIG. 3 is well known to the person skilled in the art. These commonplace elements are not described here.

It is observed moreover that the word "register" used throughout the description designates in each of the memories mentioned, both a memory area of small capacity (a few data bits) and a memory area of large capacity (making it possible to store an entire program or the whole of a sequence of transaction data).

The nonvolatile memory 305 (ROM) holds in particular the program for operating the processor 304 in a "prog" register 308.

The random access memory 306 holds data, variables and intermediate results of processing in registers which for convenience possess the same names as the data that they hold and comprise in particular:
 a register 309 in which are held recordings of unrecognized expressions, "Exp_Not_Rec;
 a counter 310 of unrecognized sentences Nb_Exp_Not_Rec; and
 a language model in a register 311, Model_Language.

It is noted furthermore that the receive module 312 and send module 313 are modules that allow the transmission of data respectively from or to the remote server 116. The wire-based or wireless techniques for receiving and for sending are well known to the person skilled in the art of telecommunications and will not be detailed further.

Figure 4:
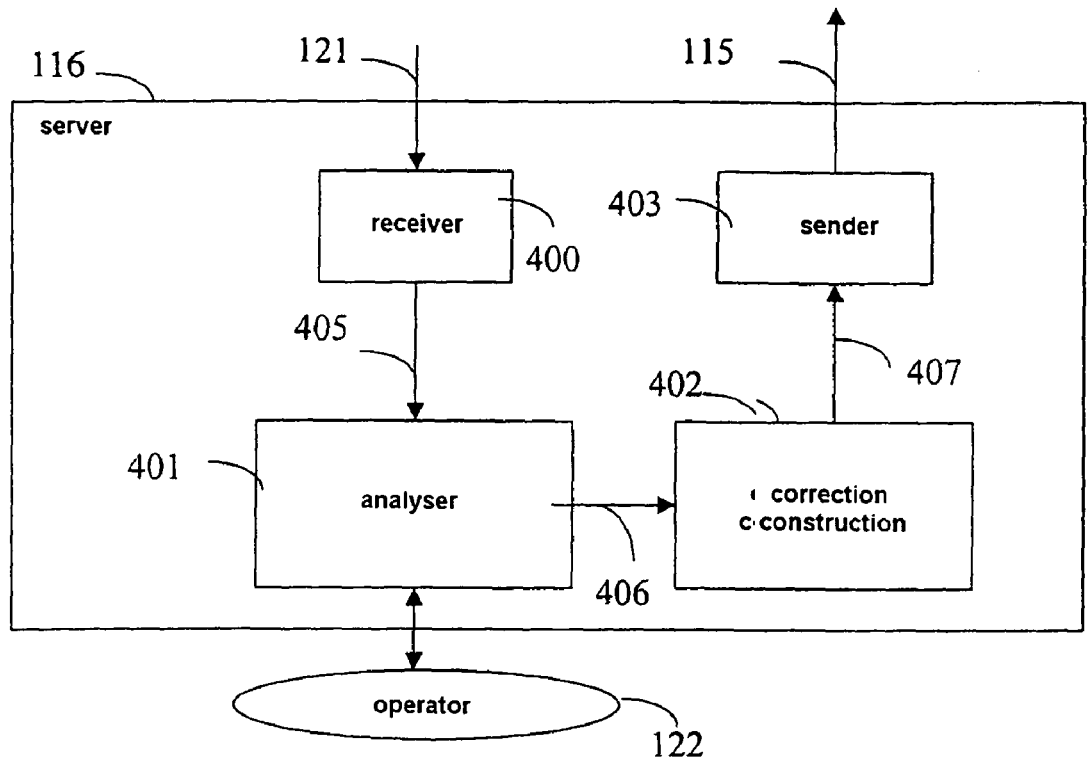
FIG. 4 depicts a schematic of the server of the system of FIG. 1.

FIG. 4 depicts the server 116 of the system illustrated with regard to FIG. 1.

It is noted that the server 116 is controlled by a human operator 122 via any man/machine interface 404 (for example, of keyboard and screen type).

The server 116 itself comprises in particular:
 a receiver 400;
 an analyser 401;
 a module 402 for construction of correction of a language model and/or a set of phonetic units; and
 a sender 403.

The receiver 400 is compatible with the sender 313 of a terminal and can receive from each terminal in particular data (for example recording) representative of unrecognized expressions via the link 121 and possibly of complementary data (for example contextual data).

The analyser 401 receives the set of data from the receiver 400 via a link 121 which it transmits to the operator 122 via an interface 404 which is for example a terminal furnished:
 with a screen and with a keyboard allowing dialogue with the server 116 and its control;
 with loudspeakers or an audio headset for listening to unrecognized recordings.

This interface 404 also allows the analyser 401 to receive information from the operator 122 indicating:
 that an unrecognized expression not covered by the language model remains incomprehensible, has no meaning within the application to the terminal and/or does not relate to the terminal (it should therefore not be included in the language model), this expression then being ignored for the correcting of the language model and discarded by the analyser 401;
 that an unrecognized expression nevertheless belongs to the language model in the strict sense (this then involves a pure recognition problem); in this case, this involves modifying the phonetic units and not the language model in the strict sense; or a translation into for example the form of a control code, after identification of the content of an expression by the operator, the unrecognized expression not belonging to the language model and having a meaning for the terminal for which it was intended; this then involves correcting the language model in the strict sense.

A combination of the second and third solutions is possible; in this case, this involves both modifying the phonetic units and the language model in the strict sense.

This embodiment corresponds to a manual processing of the unrecognized expressions. According to this embodiment, the human operator 122 listens to the unrecognized expression and analyses the reasons for its rejection. The operator 122 determines in particular whether the expression belongs to the language model or not. In the case where the expression belongs to the language model, the operator analyses the expression to identify the intrinsic recognition problem (expression belonging to the language model and which ought to have been recognized and which was not for other reasons: noise, accent of the speaker, etc.).

According to a first variant, the processing is automatic and the intervention of a human operator becomes nil. In this case, the server 116 and in particular the analyser 401 possess a relatively considerable computational power which may in particular be much larger than a terminal. According to this variant, the analyser 401 analyses each unrecognized expression in a more appropriate manner than could be done by a terminal, using, for example, a richer language model and/or more complex phonetic models. Not being subject to such strict real-time computational requirements as might be a terminal (which often requires a fast reaction time to a speaker command), the analyser 401 can also, for example, allow recognition demanding a longer processing time than in a terminal.

According to a second variant, the processing is semi-automatic and the intervention of a human operator remains limited to the cases that cannot be solved by the analyser.

The general structure of a server 116 is according to the preferred embodiment described here similar to that of a terminal such as described with regard to FIG. 3 and comprises in particular interlinked by an address and data bus:
 a processor;
 a random access memory;
 a nonvolatile memory;
 a suitable transmission module;
 a reception module; and
 a man/machine linkup interface.

Figure 5:
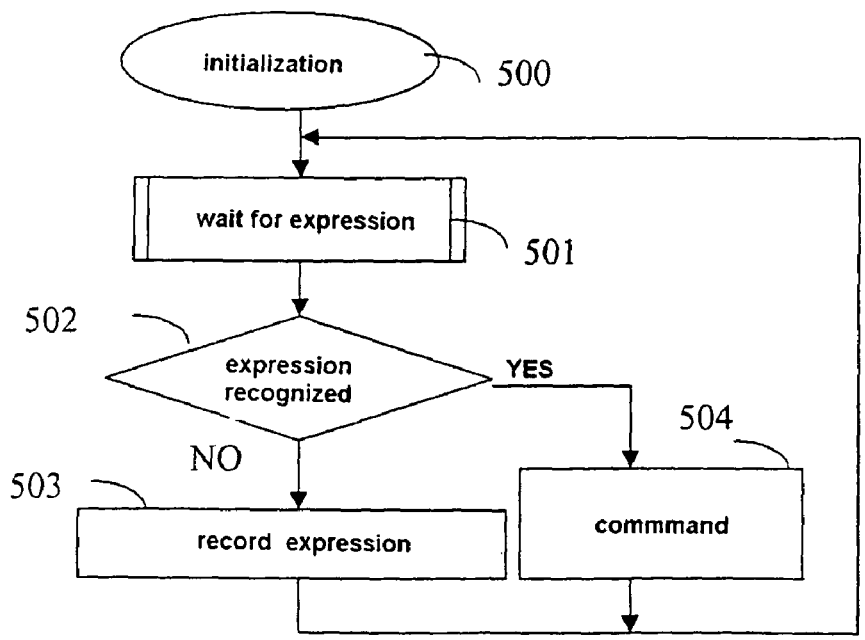
FIG. 5 represents a flow chart of the process for testing an expression and for recording data relating to unrecognized expressions, as implemented by the recognition engine of FIG. 2.

According to FIG. 5 representing a flow chart of the testing of an expression and of the recording of data relating to unrecognized expressions, as implemented by the recognition engine 203 of FIG. 2, in the course of a first step of initialization 500, the microprocessor 304 commences the execution of the program 308 and initializes the variables of the random access memory 306.

Then, in the course of a step 501 of waiting for an expression, it waits for and receives an expression sent by a speaker.

Next, in the course of a test 502, after having executed an operation of speech recognition for the expression received, it determines whether the expression has or has not been recognized according to one or more criteria illustrated with regard to the description of the rejection module 211 of FIG. 2.

If it has, in the course of a control step 504, the terminal 102 takes into account the result of the speech recognition applied to the expression received and executes an appropriate action such as for example a command.

Figure 6:
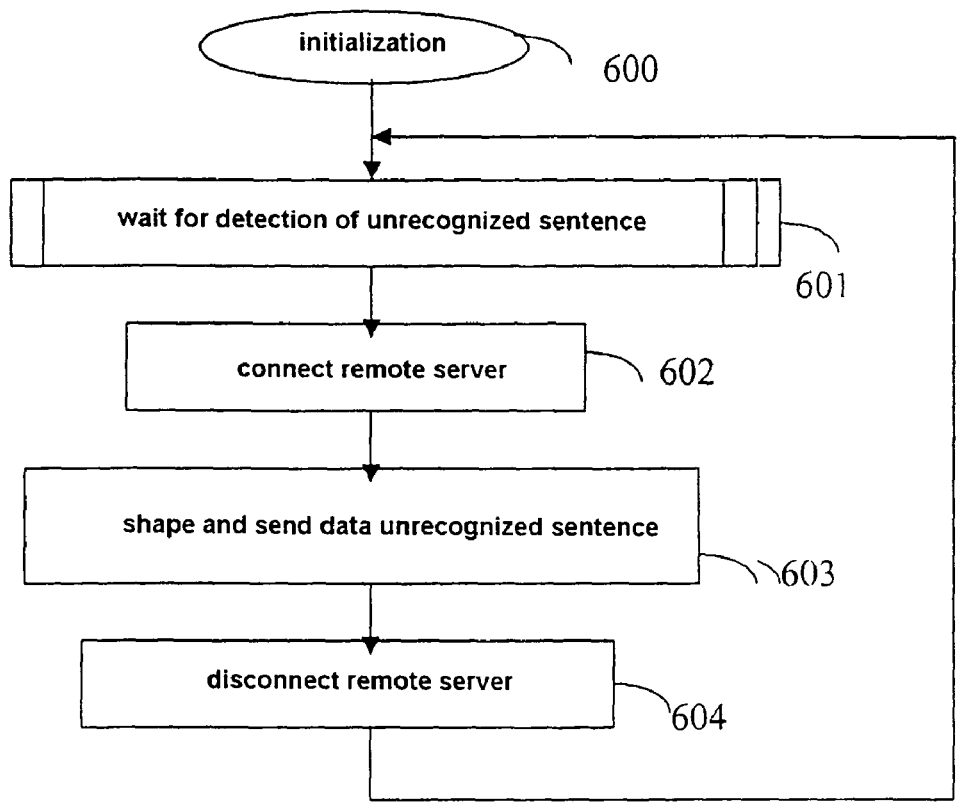
FIG. 6 represents a flow chart of the process for sending data relating to unrecognized expressions, as implemented by the rejection module of FIG. 2.

If it has not, in the course of a step 503 of recording an expression, the unrecognized expression is compressed and recorded in the storage unit 109 awaiting a transmission to the remote server 116 as illustrated with regard to FIG. 6.

On completion of one of the steps 503 or 504, step 501 of waiting for an expression is repeated.

FIG. 6 representing a flow chart of the sending of data relating to unrecognized expressions, as implemented by the rejection module of FIG. 2, in the course of a first step of initialization 600, the microprocessor 304 commences the execution of the program 308 and initializes the variables of the random access memory 306.

Then, in the course of a step 601 of waiting for expressions unrecognized by the voice recognition module 102, the microprocessor 304 waits for and then receives recordings of unrecognized expressions.

Then, in the course of a step 602, the terminal 114 connects up to the remote server 116 according to methods well known to the person skilled in the art of telecommunications.

Next, in the course of a step 603, the recordings of unrecognized expressions are shaped and sent to the remote server 116.

Then, in the course of a step 604 of disconnection, the terminal disconnects from the remote server 116 and a signal is sent between the interface 112 with the remote server and the unit 109 for storing the data corresponding to the unrecognized expressions indicating the transmission of the recordings of expressions. The data corresponding to these expressions are then erased from the storage unit 109.

Next, step 601 is repeated.

Figure 7:
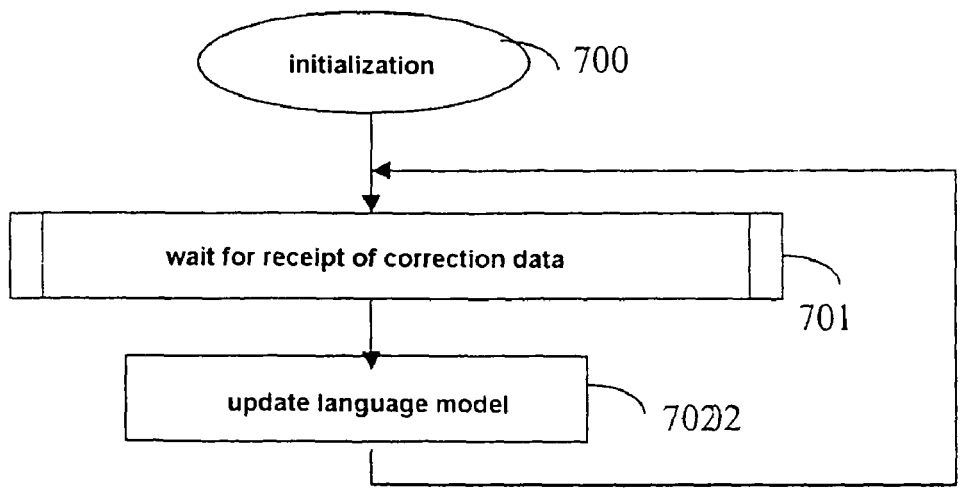
FIG. 7 represents a flow chart of the process for receiving correcting data, as implemented by the module for loading the language models of FIG. 2.

FIG. 7 represents a flow chart of the receiving of correcting data, as implemented by the module 207 for loading the language models of FIG. 2.

After a first step 700 of initialization, in the course of a step 701, the terminal places itself on standby awaiting correcting data broadcast by a server 116 to a plurality of terminals.

Next, during a step 702, the terminal takes into account the correcting data so as to update the language model and/or its set of phonetic units used by the speech recognition module. According to the nature of the correcting data, these data will be able in particular:
 to substitute for existing data in the language model and/or its set of phonetic units;
 to modify existing data;
 to supplement existing data; and/or
 to bring about the deletion of existing data.

After the execution of step 702, step 703 is repeated.

Figure 8:
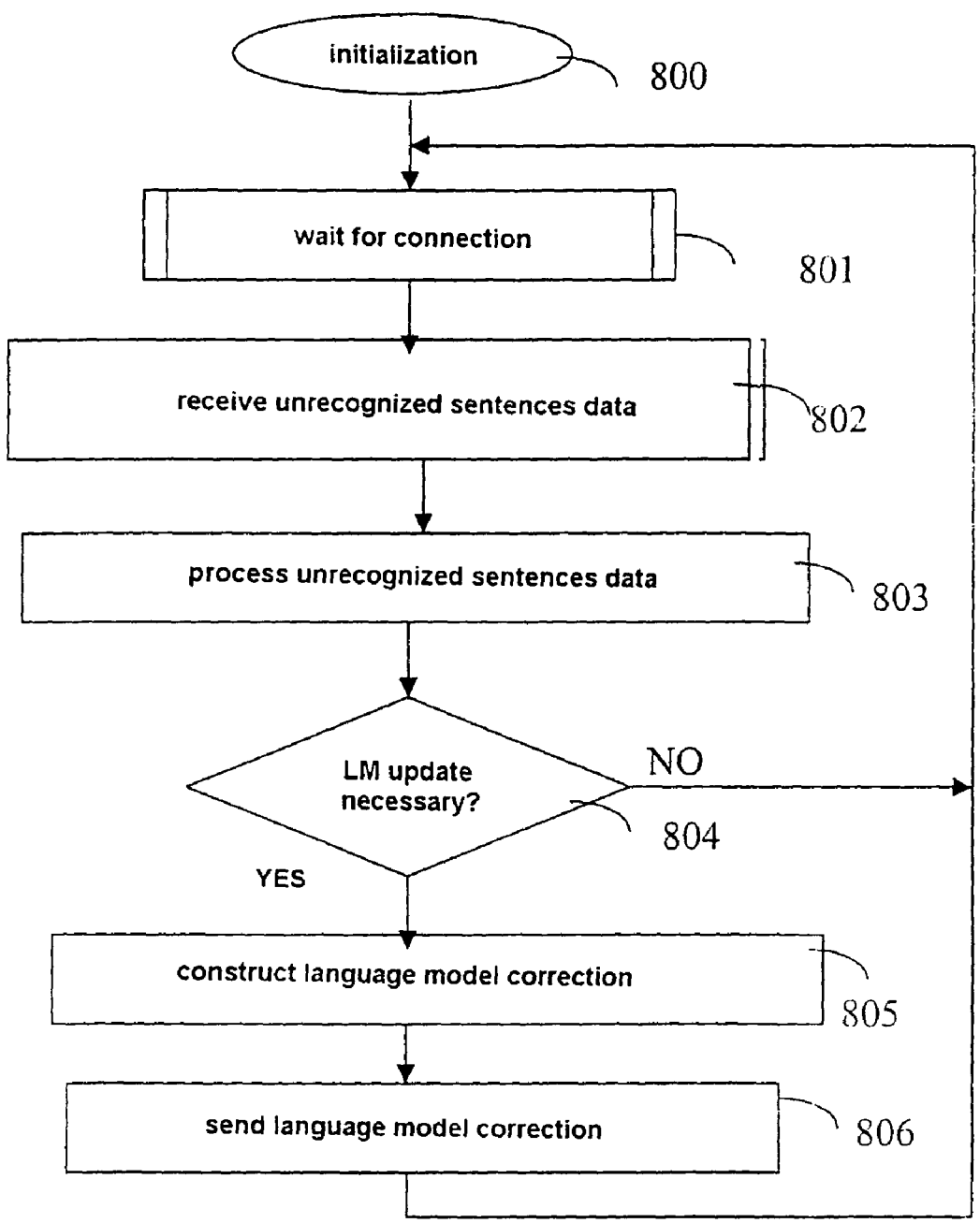
FIG. 8 represents a flow chart of the process for receiving and for processing correcting data, as implemented within the remote server of FIG. 4.

FIG. 8 represents a flow chart of the receiving and processing of correcting data, as implemented within the remote server of FIG. 4.

After a first step 800 of initialization of the parameters and of instigation of a program for management of the server, the server 116 places itself on standby waiting for a connection request originating from a terminal (which executes a step 602 illustrated with regard to FIG. 6) and establishes a connection with the terminal according to methods well known to the person skilled in the art of telecommunications.

Then, in the course of a step 802, the server 116 receives data originating from the connected terminal which executes a step 603 described previously. These data contain in particular recordings of one or more expressions rejected by the terminal because they were not recognized by a speech recognition module implemented in the terminal. When all the data have been received, the connection between the terminal and the server 116 is broken.

Next, in the course of a step 803 of processing the data received, the server 116 processes each of the received recordings of expressions either manually by the operator 122 or automatically or semi-automatically according to various alternatives illustrated with regard to FIG. 4.

Then, in the course of a test 804, the server 116 determines whether in particular one or more expressions received were comprehensible and are relevant in respect of the terminal which transmitted this or these expressions. An updating of the language models and/or of the phonetic units is then necessary.

If not, then the waiting step 801 is repeated.

In the converse case, the server 116 constructs a correction of the language model which may take several forms allowing a step 607 (illustrated previously) within the terminals after receipt of the correcting data. These correcting data comprise in particular:

an indicator specifying the nature of the correction (in particular substitution, modification, supplement, or deletion); and the correcting data themselves as a function of the indicator.

It is noted that if the language model comprises a plurality of syntactic blocks (case in particular of the language models such as described in patent PCT/FR00/03329 mentioned above), each module can be corrected separately. In this case, the correction data also comprise an indicator of the module or modules to be corrected.

Then, in the course of a step 806, the server 116 broadcasts the correcting data to one or preferably to a set of terminals which will be able to update their language model and/or set of phonetic units according to a step 607.

Step 801 is then repeated.

The procedure is thus iterative and may be repeated several times. It also allows the application to be upgraded by adding new queries.

Of course, the invention is not limited to the exemplary embodiments mentioned hereinabove.

In particular, the person skilled in the art will be able to alter the definition of the terminals implementing the invention, the invention relating to any type of device and/or module using or capable of using a speech recognition process (being of the type for example of multimedia terminal, television, video recorder, a multimedia digital decoder (or set top box), audio or video equipment, fixed or mobile terminal, etc.).

Likewise, the invention relates to any type of remote server (for example Internet servers, equipment coupled to television program broadcasters, equipment coupled to mobile communication networks, service provider equipment, etc.).

Furthermore, according to the invention, the transmission channel for the data corresponding to the unrecognized sentences and the transmission channel for the data for correcting the language models and/or phonetic units are any whatsoever and include in particular:

RF transmission pathways;
satellite transmission pathways;
the channels of television broadcasting networks;
the channels of Internet type networks;
the channels of telephone networks;
the channels of mobile networks; and
removable media.

Moreover, it is noted that the invention relates not only to unrecognized sentences but relates to any type of vocal expression such as for example one or more sentences, an isolated or unisolated word, a phrase, a speech code allowing dialogue between a machine and its user. These oral expressions may be associated not only with commands, but with any type of data that can form the subject of a dialogue between a machine and its user, as, for example, information data that the user can transmit to the machine, configuration data, programming data etc.

It is also noted that the method of updating the language models which is described by the patent applies not only to processes of speech recognition in the strict sense, but applies also to processes for recognition of textual inputs supporting orthographic mistakes and/or typing mistakes, and also based on Markovian models or language models in the strict sense, as described in the patent.

It will be noted that the invention is not limited to a purely hardware installation but that it can also be implemented in the form of a sequence of instructions of a computer program or any form mixing a hardware part and a software part. In the case where the invention is installed partially or totally in software form, the corresponding sequence of instructions may be stored in a removable storage means (such as for example a diskette, a CD-ROM or a DVD-ROM) or otherwise, this means of storage being readable partially or totally by a computer or a microprocessor.

The invention claimed is:

1. Speech recognition process implemented in a terminal and a remote server, said terminal comprising a language model, comprising the steps of detection of an expression unrecognized by said language model;

recording in said terminal of data representative of said unrecognized expression;

repetition of the step of detection of an unrecognized expression and the step of recording of representative data, the repetition allowing recording of data representative of a plurality of unrecognized expressions;

transmission to said remote server of recorded data representative of the plurality of unrecognized expressions and at least one of context data and information related to a speaker;

analysis, by said remote server, of said data representative of said plurality of unrecognized expressions and at least one of said context data and said information related to a speaker, and generating information recognizing said unrecognized expressions, said generated information including correcting information to partially or completely modify said language model by adding, deleting or replacing elements therein, an unrecognized expression having no meaning being ignored for the updating of the language model and being discarded from the correcting information for updating said language model;

transmitting, by said server, said correcting information to said terminal; and updating, by said terminal, said language model.

2. Speech recognition process according to claim 1, said data representative of said unrecognized expressions comprising a compressed speech recording representative of parameters descriptive of an acoustic signal.

3. Speech recognition process according to claim 1, comprising a step of transmission, by said terminal, of said recorded data representative of unrecognized expressions to said remote server;

during said step of transmission by said terminal, the speech recognition process furthermore transmitting to said remote server an item of information forming part of a group comprising:

information of context of use of said speech recognition process when said expression has not been recognized; and information relating to a speaker who has uttered said unrecognized expression.

4. Speech recognition process according to claim 1, in which the process implements one of an encryption and a scrambling of said recorded data.

5. Speech recognition system using a language model in a terminal and a remote server, comprising:
- an analyser detecting expressions unrecognized by said language model;
- a recorder for recording data representative of said unrecognized expressions;
- a transmitter comprising means for transmitting to said remote server contents of said recorder, including recorded data representative of said unrecognized expressions, and at least one of context data and information related to a speaker;
- said remote server comprising means for making comprehensible at least some of said expressions unrecognized by said language model, generating information and updating said language model, said generated information including correcting information to partially or completely modify said language model by adding, deleting or replacing elements therein, an unrecognized expression having no meaning being ignored for the updating of the language model and being discarded from the information for updating;
- said remote server comprising means for transmitting said correcting information to said language model for updating said language model so as to allow said language model to recognize said unrecognized expressions.

* * * * *